(12) United States Patent
Suzuki et al.

(10) Patent No.: US 10,158,143 B2
(45) Date of Patent: Dec. 18, 2018

(54) METHOD FOR PRODUCING LITHIUM SOLID STATE BATTERY

(71) Applicants: NATIONAL INSTITUTE OF ADVANCED INDUSTRIAL SCIENCE AND TECHNOLOGY, Tokyo-to (JP); TOYOTA JIDOSHA KABUSHIKI KAISHA, Toyota-shi, Aichi-ken (JP)

(72) Inventors: Muneyasu Suzuki, Tsukuba (JP); Jun Akedo, Tsukuba (JP); Takashi Takemoto, Toyota (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 56 days.

(21) Appl. No.: 14/942,494

(22) Filed: Nov. 16, 2015

(65) Prior Publication Data

US 2016/0141713 A1    May 19, 2016

(30) Foreign Application Priority Data

Nov. 18, 2014  (JP) .................................. 2014-233547

(51) Int. Cl.
  *H01M 10/04*      (2006.01)
  *H01M 10/0525*    (2010.01)
  (Continued)

(52) U.S. Cl.
  CPC ....... *H01M 10/0562* (2013.01); *H01M 10/04* (2013.01); *H01M 10/0525* (2013.01); *H01M 10/0585* (2013.01); *H01M 2300/0068* (2013.01)

(58) Field of Classification Search
  CPC ............. H01M 10/058; H01M 10/052; H01M 10/0562; H01M 10/0585; H01M 10/0525; H01M 2220/20; H01M 2220/30
  (Continued)

(56) References Cited

U.S. PATENT DOCUMENTS

2010/0323244 A1* 12/2010 Chiang ................. H01B 1/122
                                              429/220
2013/0260023 A1* 10/2013 Suyama ............. H01M 4/0402
                                              427/126.1

FOREIGN PATENT DOCUMENTS

JP   2005-078985 A   3/2005
JP   2008-021424 A   1/2008
(Continued)

OTHER PUBLICATIONS

Oct. 5, 2018 Office Action issued in U.S. Appl. No. 15/827,997.

*Primary Examiner* — Osei K Amponsah
(74) *Attorney, Agent, or Firm* — Oliff PLC

(57) ABSTRACT

A method for producing a lithium solid state battery having a solid electrolyte membrane with high Li ion conductivity, in which firm interface bonding is formed on both sides of the membrane, comprising steps of: a membrane-forming step of forming CSE1 not containing a binder, composed of a sulfide solid electrolyte material, on a cathode active material layer by an AD method and ASE1 not containing a binder, composed of a sulfide solid electrolyte material, on an anode active material layer by an AD method, and a pressing step of forming SE1 with the CSE1 and the ASE1 integrated by opposing and pressing the CSE1 and the ASE1, wherein the SE1 such that an interface between the CSE1 and the ASE1 disappeared is formed by improving denseness of the CSE1 and the ASE1 in the pressing step.

9 Claims, 9 Drawing Sheets

(51) Int. Cl.
*H01M 10/0562* (2010.01)
*H01M 10/0585* (2010.01)
*H01M 10/058* (2010.01)
*H01M 10/052* (2010.01)

(58) Field of Classification Search
USPC .............................................. 29/623.1–623.5
See application file for complete search history.

(56) References Cited

FOREIGN PATENT DOCUMENTS

| | | | | |
|---|---|---|---|---|
| JP | 2008-103203 A | | 5/2008 | |
| JP | 2008-103289 | * | 5/2008 | ............ H01M 10/38 |
| JP | 2012-094482 | * | 5/2012 | ........ H01M 10/0562 |
| JP | 2013-012416 A | | 1/2013 | |
| JP | 2013-062228 A | | 4/2013 | |

* cited by examiner

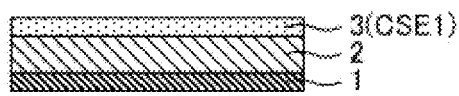
FIG. 1A
FIG. 1B
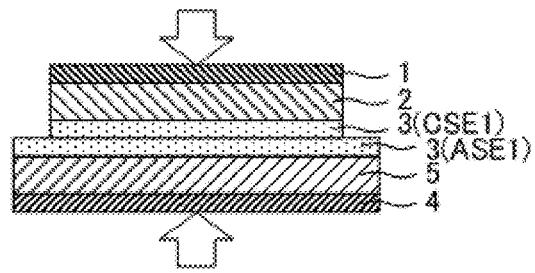
FIG. 1C
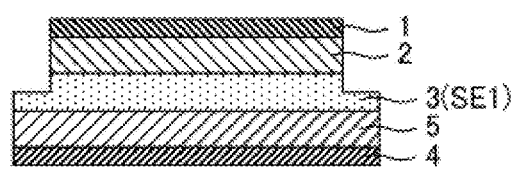
FIG. 1D
FIG. 2
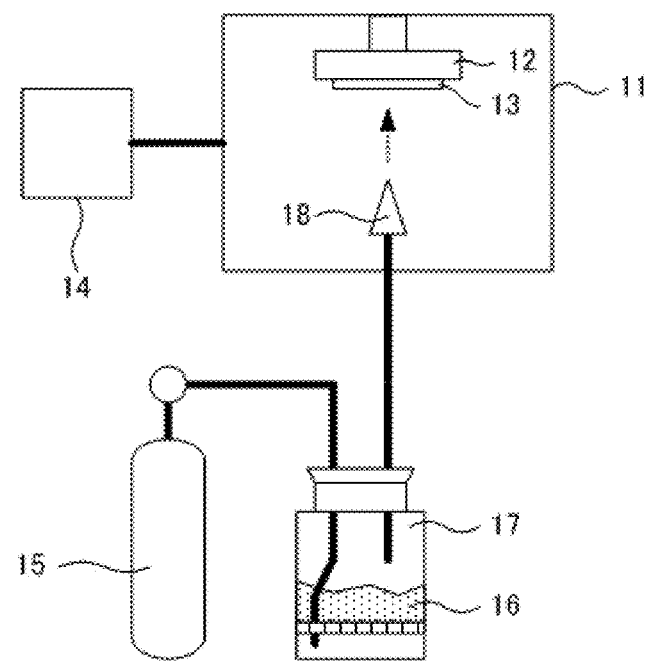

FIG. 3A
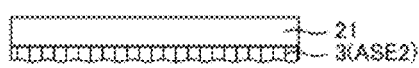
FIG. 3B
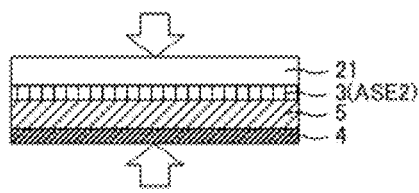
FIG. 3C
FIG. 3D
FIG. 4A     FIG. 4C
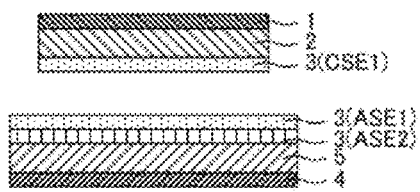  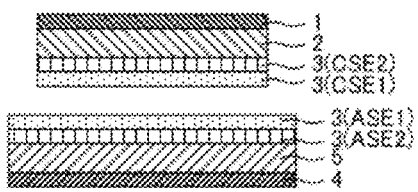
FIG. 4B
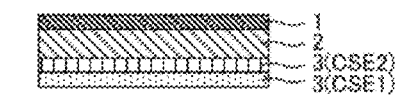

SE FORMED BY AD METHOD

SE FORMED BY COATING METHOD

METHOD FOR PRODUCING LITHIUM SOLID STATE BATTERY

TECHNICAL FIELD

The present invention relates to a method for producing a lithium solid state battery having a solid electrolyte membrane with high Li ion conductivity, in which firm interface bonding is formed on both sides of the solid electrolyte membrane.

BACKGROUND ART

In recent years, in accordance with a rapid spread of information relevant apparatuses such as a personal computer, a video camera and a portable telephone, the development of a battery to be utilized as a power source thereof has been active. The development of a high-output and high-capacity battery for an electric automobile or a hybrid automobile has been advanced also in the automobile industry. A lithium ion battery has the advantage that energy density is high among various kinds of batteries.

Liquid electrolyte containing a flammable organic solvent is used for a presently commercialized lithium ion battery, so that a device for restraining temperature rise during a short circuit and a device for preventing the short circuit are necessary therefor. In contrast, a lithium solid state battery all-solidified by replacing the liquid electrolyte with a solid electrolyte layer intends the simplification of the safety device and is excellent in production cost and productivity for the reason that the flammable organic solvent is not used in the battery.

Various methods are known as a method for forming a solid electrolyte layer. In Patent Literature 1, a method for producing a sulfide-based solid state battery, in which sulfide-based solid electrolyte slurry containing a sulfide-based solid electrolyte, a binder and a fatty acid ester is prepared and coated on one electrode to form an electrolyte layer and laminate the other electrode on the electrolyte layer, is disclosed. Also, in Patent Literature 2, a blast method and an aerosol deposition method are exemplified as a method for forming an electrolyte with a membrane thickness of 500 μm or less, composed substantially of only a lithium ion conductive solid substance.

Also, in Patent Literature 3, a blast method, an aerosol deposition method, a cold spray method, a sputtering method, a vapor growth method and a thermal spraying method are exemplified as a method for forming a solid electrolyte layer. Also, in Patent Literature 4, a method for producing a nonaqueous electrolyte battery, in which a cathode body having an amorphous cathode side solid electrolyte layer on a cathode active material and an anode body having an amorphous anode side solid electrolyte layer on an anode active material layer are prepared and heat-treated while superposing the cathode side solid electrolyte layer and the anode side solid electrolyte layer so as to contact with each other, and bonded by crystallizing the cathode side solid electrolyte layer and the anode side solid electrolyte layer, is disclosed. Incidentally, in Patent Literature 4, a vacuum deposition method, a sputtering method, an ion plating method and a laser ablation method are disclosed as a method for forming the cathode side solid electrolyte layer (PSE layer).

CITATION LIST

Patent Literature

Patent Literature 1: Japanese Patent Application Publication (JPA) No. 2013-062228

Patent Literature 2: JP-A No. 2008-021424
Patent Literature 3: JP-A No. 2008-103203
Patent Literature 4: JP-A No. 2013-012416

SUMMARY OF INVENTION

Technical Problem

For example, the sulfide-based solid electrolyte slurry in Patent Literature 1 has a binder. The binder ordinarily does not have Li ion conductivity, so that the Li ion conductance of a solid electrolyte membrane having the binder becomes lower than the Li ion conductance of the sulfide-based solid electrolyte itself contained in the solid electrolyte membrane.

On the other hand, in Patent Literatures 2 and 3, although specific experimental results are not described, an aerosol deposition method (an AD method) is exemplified as a method for forming a solid electrolyte membrane. For example, in the case where a solid electrolyte membrane is formed on a cathode active material layer by an AD method, firm interface bonding may be formed between the solid electrolyte membrane and the cathode active material layer, but equal interface bonding may not be formed between the solid electrolyte membrane and the anode active material layer. Thus, in the case of using an AD method, firm interface bonding is formed with difficulty on both sides of the solid electrolyte membrane.

The present invention has been made in view of the actual circumstances, and the main object thereof is to provide a method for producing a lithium solid state battery having a solid electrolyte membrane with high Li ion conductivity, in which firm interface bonding is formed on both sides of the solid electrolyte membrane.

Solution to Problem

In order to solve the problems, the present invention provides a method for producing a lithium solid state battery, comprising steps of: a membrane-forming step of forming a solid electrolyte membrane (CSE1) not containing a binder, composed of a sulfide solid electrolyte material, on a cathode active material layer by an aerosol deposition method and a solid electrolyte membrane (ASE1) not containing a binder, composed of a sulfide solid electrolyte material, on an anode active material layer by an aerosol deposition method; and a pressing step of forming a solid electrolyte membrane (SE1) with the CSE1 and the ASE1 integrated by opposing and pressing the CSE1 and the ASE1, wherein the SE1 such that an interface between the CSE1 and the ASE1 disappeared is formed by improving denseness of the CSE1 and the ASE1 in the pressing step.

According to the present invention, the SE1 is formed from the CSE1 and the ASE1 not containing a binder, so that a lithium solid state battery having a solid electrolyte membrane with high Li ion conductivity may be obtained. Also, the CSE1 is formed on a cathode active material layer by an AD method and the ASE1 is formed on an anode active material layer by an AD method similarly to form the SE1 by bonding the CSE1 and the ASE1, so that a lithium solid state battery, in which firm interface bonding is formed on both sides of the SE1, may be obtained.

In the invention, a porosity of a cross section of the CSE1 and a porosity of a cross section of the ASE1 are each preferably within a range of 1% to 40%.

In the invention, a solid electrolyte membrane (CSE2) is preferably formed on the cathode active material layer by a coating method before forming the CSE1.

In the invention, a solid electrolyte membrane (ASE2) is preferably formed on the anode active material layer by a coating method before forming the ASE1.

In the invention, a membrane-forming treatment for forming a solid electrolyte membrane (ASE3') on the anode active material layer by an aerosol deposition method, and a pressing treatment for forming a solid electrolyte membrane (ASE3) by pressing the ASE3' are preferably performed before forming the ASE1.

In the invention, all solid electrolyte membranes existing between the cathode active material layer and the anode active material layer are preferably formed by an aerosol deposition method.

Advantageous Effects of Invention

The present invention produces the effect such as to allow a lithium solid state battery having a solid electrolyte membrane with high Li ion conductivity, in which firm interface bonding is formed on both sides of the solid electrolyte membrane.

BRIEF DESCRIPTION OF DRAWINGS

FIGS. 1A to 1D are schematic cross-sectional views showing an example of a method for producing a lithium solid state battery of the present invention;

FIG. 2 is a schematic view explaining an aerosol deposition method;

FIGS. 3A to 3D are schematic cross-sectional views each showing another example of a method for producing a lithium solid state battery of the present invention;

FIGS. 4A to 4C are schematic cross-sectional views each showing another example of a method for producing a lithium solid state battery of the present invention;

DESCRIPTION OF EMBODIMENTS

Figure 5A:
FIGS. 5A to 5D are schematic cross-sectional views each showing another example of a method for producing a lithium solid state battery of the present invention.

A method for producing a lithium solid state battery of the present invention is hereinafter described in detail.

FIGS. 1A to 1D are schematic cross-sectional views showing an example of a method for producing a lithium solid state battery of the present invention. In FIGS. 1A to 1D, first, a cathode active material layer 2 is formed on a cathode current collector 1 to directly form a solid electrolyte membrane 3 (CSE1) not containing a binder, composed of a sulfide solid electrolyte material, on the cathode active material layer 2 by an aerosol deposition method (an AD method) (FIG. 1A). Next, an anode active material layer 5 is formed on an anode current collector 4 to directly form a solid electrolyte membrane 3 (ASE1) not containing a binder, composed of a sulfide solid electrolyte material, on the anode active material layer 5 by an AD method (FIG. 1B).

Here, FIG. 2 is a schematic view explaining an AD method. In FIG. 2, a pedestal 12 is placed inside a chamber 11 and a substrate 13 is disposed on the pedestal 12. Also, the pressure inside the chamber 11 may be controlled to an optional decompressed state by a rotary pump 14. On the other hand, raw material powder 16 is aerosolized inside an aerosol generator 17 by carrying-in gas supplied from a gas bomb 15. In addition, the aerosolized raw material powder is jetted from a nozzle 18 disposed inside the chamber 11 toward the substrate 13. The accumulation with plastic deformation of the particles is caused on the surface of the substrate 13 to form a solid electrolyte membrane.

Next, as shown in FIG. 1C, the CSE1 and the ASE1 are opposed and pressed. Thus, a solid electrolyte membrane (SE1) with the CSE1 and the ASE1 integrated is formed (FIG. 1D). In particular, in the present invention, the SE1 such that an interface between the CSE1 and the ASE1 disappeared is formed by improving denseness of the CSE1 and the ASE1 in a pressing step.

According to the present invention, the SE1 is formed from the CSE1 and the ASE1 not containing a binder, so that a lithium solid state battery having a solid electrolyte membrane with high Li ion conductivity may be obtained. Also, the CSE1 is formed on a cathode active material layer by an AD method and the ASE1 is formed on an anode active material layer by an AD method similarly to form the SE1 by bonding the CSE1 and the ASE1, so that a lithium solid state battery, in which firm interface bonding is formed on both sides of the SE1, may be obtained.

Also, in the present invention, the SE1 such that an interface between the CSE1 and the ASE1 disappeared is formed, so that a solid electrolyte membrane with low interface resistance may be obtained. The reason why the interface disappears is guessed to be that microstructural change is caused at the interface between the CSE1 and the ASE1 in the process of improving denseness of the CSE1 and the ASE1 in a pressing step. Such a phenomenon is a new phenomenon which has not been known conventionally. Also, the case of forming a solid electrolyte membrane by an AD method allows a dense membrane as compared with the case of forming a solid electrolyte membrane by powder compacting; however, generally, a denser membrane must less cause a phenomenon such that the interface disappears. Yet, the inventors of the present invention have completed the present invention by finding out that in a solid electrolyte membrane formed by an AD method, a peculiar phenomenon occurs, such that microstructural change is caused through the pressing step despite the dense membrane and the interface disappears, and by applying the fact.

Also, the problem is that the sulfide-based solid electrolyte slurry described in Patent Literature 1 has a binder, so that the Li ion conductance of a solid electrolyte membrane is low. In contrast, the present invention has the advantage that Li ion conductivity is high by reason of forming the SE1 from the CSE1 and the ASE1 not containing a binder. Also, in Patent Literatures 2 and 3, specific experimental results are not described, and neither description nor suggestion is offered on a phenomenon such that the interface between the CSE1 and the ASE1 disappears. Incidentally, in Patent Literature 2, a current collector not having Li ion conductivity is disposed between a cathode material and an anode material, so that a battery is not organized. Also, in Patent Literature 4, the cathode side solid electrolyte layer and the anode side solid electrolyte layer are bonded by crystallizing, but an idea of bonding by pressing is not described nor suggested.

The producing method for a lithium solid state battery of the present invention is hereinafter described in each step.

1. Membrane-Forming Step

The membrane-forming step in the present invention is a step of forming a solid electrolyte membrane (CSE1) not containing a binder, composed of a sulfide solid electrolyte material, on a cathode active material layer by an AD method and a solid electrolyte membrane (ASE1) not containing a binder, composed of a sulfide solid electrolyte material, on an anode active material layer by an AD method.

(1) Formation of CSE1

In the present invention, a solid electrolyte membrane (CSE1) not containing a binder, composed of a sulfide solid electrolyte material, is formed on a cathode active material layer by an AD method. The CSE1 may be formed directly on a cathode active material layer, or through another solid electrolyte membrane on a cathode active material layer.

(i) Raw Material Powder

In the present invention, particles of a sulfide solid electrolyte material are used as raw material powder used for an AD method. Examples of the sulfide solid electrolyte material include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (m and n are positive numbers, Z is any of Ge, Zn and Ga.), $Li_2S$—$GeS_2$, $Li_2S$—$SiS_2$—$Li\,PO_4$, $Li_2S$—$SiS_2$—$Li_xMO_y$ (x and y are positive numbers, M is any of P, Si, Ge, B, Al, Ga and In), and $Li_{10}GeP_2S_{12}$.

The sulfide solid electrolyte material preferably has Li, A (A is at least one of P, Si, Ge, B and Al) and S. Above all, A is preferably at least one of P, Si and Ge. Also, the sulfide solid electrolyte material may be amorphous, crystalline or glass ceramics.

Also, particles of the sulfide solid electrolyte material contain sulfur as an anionic component. Thus, the particles of the sulfide solid electrolyte material have the property of being soft and easily deformed plastically as compared with particles of an oxide solid electrolyte material. The hardness of the particles of the sulfide solid electrolyte material may be evaluated through yield stress measurement by a nano-indent method, for example. The yield stress of the particles of the sulfide solid electrolyte material is preferably within a range of 300 MPa to 700 MPa, for example.

The average particle diameter $D_{50}$ of the raw material powder is not particularly limited if the average particle diameter allows desired CSE1, but is, for example, within a range of 100 nm to 10 μm, preferably, within a range of 500 nm to 5 μm.

(ii) AD Method

In the present invention, CSE1 is formed by an AD method. The AD method allows a dense membrane with high adhesion properties by using 'normal-temperature shock solidification phenomenon' (a phenomenon such that raw material powder solidifies with high density at normal temperature without heating and only by applying mechanical shock). In addition, depending on the quality of the material of the membrane, the AD method has the advantage that the film-forming rate is several tens of times or more the rate of conventional thin-film-forming technology. Also, high pressure is applied to only so extremely limited region of a substrate as to bring the advantage that the damage to the substrate is small and interdiffusion due to heat is not caused. In particular, in the case of using the sulfide solid electrolyte material as raw material powder, the sulfide solid electrolyte material collides with the substrate at high speed to deform plastically, and new surfaces of the sulfide solid electrolyte material bind with each other to allow a dense membrane without any gaps between particles. Also, the AD method has the advantage that raw material powder collides with the substrate at so high speed that the membrane may be formed directly on the substrate by anchor effect.

In the AD method, collision rate at which raw material powder collides with the substrate is not particularly limited if the collision rate is a rate such as to allow desired CSE1, but is preferably within a range of 100 m/s to 600 m/s, for example. Incidentally, collision rate may be measured by the method described in M. Lebedev et al., "Simple self-selective method of velocity measurement for particles in impact-based deposition", J. Vac. Sci. Technol. A18(2), 563-566 (2000). Specifically, the measurement is performed by using a collision rate measuring instrument, and the maximum rate $V_{max}$ and the minimum rate $V_{min}$ may be calculated by the following formula.

$$V_{max} = \frac{WL}{d_1 + \frac{\delta}{2} + L \times \sin(\alpha)}$$ [Mathematical Formula 1]

$$V_{min} = \frac{WL}{d_2 - \frac{\delta}{2} - L \times \sin(\alpha)}$$

$$W = r^{\omega}(m/s)$$

$$\omega = 2\pi/T$$

In the formula, "r" is a radius of rotation of a nozzle, T is a rotational period of a nozzle, δ is a slit width, L is a distance between a slit and a substrate, α is an angle of divergence of aerosol, $d_1$ is a location of powder which reaches a substrate earliest through a slit, and $d_2$ is a location of powder which reaches a substrate latest through a slit.

The in-chamber pressure during membrane formation by the AD method is not particularly limited but is, for example, 1 Pa or more, preferably, 10 Pa or more. On the other hand, the in-chamber pressure is, for example, 50 kPa or less, preferably, 1 kPa or less.

Kinds of carrier gas in the AD method are not particularly limited but examples thereof include inert gases such as helium (He), argon (Ar) and nitrogen ($N_2$), and dry air. Also, the gas flow rate of carrier gas is not particularly limited if the gas flow rate is a flow rate such as to allow desired aerosol to be maintained, but is preferably within a range of 1 L/min. to 20 L/min. with respect to a 500-mL aerosol vessel, for example.

(iii) CSE1

The CSE1 obtained by the AD method is a solid electrolyte membrane not containing a binder, composed of a sulfide solid electrolyte material. The CSE1 is preferably composed of only a sulfide solid electrolyte material. Also, the CSE1 is a solid electrolyte membrane subject to interface bonding to the after-mentioned ASE1, and ordinarily has pores. These pores are pores such that an interface between the CSE1 and the ASE1 disappears by pressing.

The degree of pores of the CSE1 may be evaluated by observing a cross-sectional image of the CSE1, for example. The porosity of a cross section of the CSE1 may be, for example, 1% or more, 3% or more, 5% or more, or 7% or more. On the other hand, the porosity of a cross section of the CSE1 may be, for example, 40% or less, 30% or less, 20% or less, or 15% or less.

The membrane thickness of the CSE1 (the membrane thickness before pressing) becomes ordinarily larger than the average particle diameter of raw material powder, and is, for example, within a range of 100 nm to 50 μm, preferably, within a range of 1 μm to 25 μm.

(iv) Cathode Active Material Layer

A cathode active material layer in the present invention contains at least a cathode active material. In addition, the cathode active material layer may contain at least one of a solid electrolyte material, a conductive material and a binder. Kinds of the cathode active material are not particularly limited but examples thereof include an oxide active material. Examples of the oxide active material include rock salt bed type active materials such as $LiCoO_2$, $LiMnO_2$, $LiNiO_2$, $LiVO_2$ and $LiNi_{1/3}Co_{1/3}Mn_{1/3}O_2$, spinel type active materials such as $LiMn_2O_4$ and $Li(Ni_{0.5}Mn_{1.5})O_4$, and olivine type active materials such as $LiFePO_4$, $LiMnPO_4$, $LiNiPO_4$ and $LiCuPO_4$.

Examples of the solid electrolyte material include the sulfide solid electrolyte material described above. The sulfide solid electrolyte material contained in the cathode active material layer and the sulfide solid electrolyte material contained in the solid electrolyte membrane may be the same. Examples of the conductive material include carbon materials such as acetylene black, Ketjen Black, VGCF and graphite. Examples of the binder include a fluorine-containing binder such as polyvinylidene fluoride (PVDF).

The cathode active material layer in the present invention may be a mixture layer containing particles of the cathode active material, a thin membrane layer of the cathode active material, or a sintered body layer of the cathode active material. A method for forming the cathode active material layer is not particularly limited but examples thereof include a coating method. In a coating method, ordinarily, slurry in which at least the cathode active material is dispersed into a dispersion medium is applied on a substrate (such as a cathode current collector) and dried to thereby form the cathode active material layer. Also, the obtained cathode active material layer is preferably pressed. The reason therefor is to allow denseness of the cathode active material layer to be improved. In particular, in the case where the slurry contains the sulfide solid electrolyte material, the cathode active material layer is preferably pressed by pressure (such as a pressure of 2 ton/$cm^2$ or more) such that the sulfide solid electrolyte material is plastically deformed. The thickness of the cathode active material layer is preferably within a range of 0.1 μm to 500 μm, for example.

(2) Formation of ASE1

In the present invention, a solid electrolyte membrane (ASE1) not containing a binder, composed of a sulfide solid electrolyte material, is formed on an anode active material layer by an AD method. The ASE1 may be formed directly on an anode active material layer, or through another solid electrolyte membrane on an anode active material layer. The conditions of the AD method and the membrane obtained by the AD method are the same as the contents described above; therefore, the description herein is omitted. Also, the sulfide solid electrolyte material of the ASE1 and the CSE1 may be the same or different; the former is preferable.

An anode active material layer in the present invention contains at least an anode active material. In addition, the anode active material layer may contain at least one of a solid electrolyte material, a conductive material and a binder. Kinds of the anode active material are not particularly limited but examples thereof include a carbon active material such as mesocarbon microbeads (MCMB), high orientation property graphite (HOPG), hard carbon and soft carbon, a metal active material such as In, Al, Si and Sn, and an oxide active material such as $Li_4Ti_5O_{12}$.

Examples of the solid electrolyte material include the sulfide solid electrolyte material described above. The sulfide solid electrolyte material contained in the anode active material layer and the sulfide solid electrolyte material contained in the solid electrolyte membrane may be the same. The conductive material and the binder are the same as the contents described above.

The anode active material layer in the present invention may be a mixture layer containing particles of the anode active material, a thin membrane layer of the anode active material, or a sintered body layer of the anode active material. A method for forming the anode active material layer is not particularly limited but examples thereof include a coating method. In a coating method, ordinarily, slurry in which at least the anode active material is dispersed into a dispersion medium is applied on a substrate (such as an anode current collector) and dried to thereby form the anode active material layer. Also, the obtained anode active material layer is preferably pressed. The reason therefor is to allow denseness of the anode active material layer to be improved. In particular, in the case where the slurry contains the sulfide solid electrolyte material, the anode active material layer is preferably pressed by pressure (such as a pressure of 2 ton/$cm^2$ or more) such that the sulfide solid electrolyte material is plastically deformed. The thickness of the anode active material layer is preferably within a range of 0.1 μm to 500 μm, for example.

(3) Formation of CSE2 and ASE2

In the present invention, a solid electrolyte membrane formed by an AD method and a solid electrolyte membrane formed by a coating method may be used in combination. The formation of a solid electrolyte membrane by a coating method allows mass productivity to be improved. Specifically, a solid electrolyte membrane (CSE2) may be formed on a cathode active material layer by a coating method before forming CSE1. Also, a solid electrolyte membrane (ASE2) may be formed on an anode active material layer by a coating method before forming ASE1.

For example, in FIGS. 3A to 3D, a member, in which an anode active material layer 5 is formed on an anode current collector 4, and a member having a solid electrolyte membrane 3 (ASE2) formed on a substrate 21 by a coating method are prepared (FIG. 3A). Next, the anode active material layer 5 and the ASE2 are pressed while opposed (FIG. 3B). Thus, denseness of the anode active material layer 5 and the ASE2 is improved, and simultaneously the ASE2 is transferred onto the anode active material layer 5 (FIG. 3C). Thereafter, ASE1 is formed on the ASE2 by an AD method (FIG. 3D). Incidentally, in FIGS. 3A to 3D, the ASE2 is formed on the anode active material layer 5 by transference, and the ASE2 may be formed on the anode active material layer 5 by a coating method.

The sulfide solid electrolyte material of the CSE1 and the CSE2 may be the same or different; the former is preferable. Similarly, the sulfide solid electrolyte material of the ASE1 and the ASE2 may be the same or different; the former is preferable. Also, the CSE2 and the ASE2 may contain a binder or not contain a binder. The membrane thickness of the CSE2 or the ASE2 (the membrane thickness before pressing) is not particularly limited but is within a range of 3 µm to 50 µm, for example.

In a coating method, ordinarily, slurry in which the sulfide solid electrolyte material is dispersed into a dispersion medium is applied on a substrate and dried to thereby form the solid electrolyte membrane (the CSE2 or the ASE2). Also, the obtained solid electrolyte membrane is preferably pressed. The reason therefor is to allow denseness of the solid electrolyte membrane to be improved. Specifically, the solid electrolyte membrane is preferably pressed by pressure (such as a pressure of 2 ton/cm$^2$ or more) such that the sulfide solid electrolyte material is plastically deformed.

The present invention may offer a combination such that a member on the anode side has the ASE2 and a member on the cathode side does not have the CSE2 as shown in FIG. 4A, a combination such that a member on the cathode side has the CSE2 and a member on the anode side does not have the ASE2 as shown in FIG. 4B, or a combination such that a member on the cathode side has the CSE2 and a member on the anode side has the ASE2 as shown in FIG. 4C.

(4) Formation of CSE3 and ASE3

In the present invention, a solid electrolyte membrane obtained by pressing a membrane formed by an AD method may be used. The pressing of a membrane formed by an AD method allows a denser and firmer solid electrolyte membrane. Specifically, a membrane-forming treatment for forming a solid electrolyte membrane (CSE3') on the cathode active material layer by an AD method before forming the CSE1, and a pressing treatment for forming a solid electrolyte membrane (CSE3) by pressing the CSE3' may be performed. Similarly, a membrane-forming treatment for forming a solid electrolyte membrane (ASE3') on the anode active material layer by an AD method before forming the ASE1, and a pressing treatment for forming a solid electrolyte membrane (ASE3) by pressing the ASE3' may be performed.

Figure 5B:
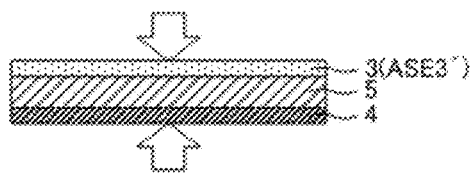
Figure 5C:
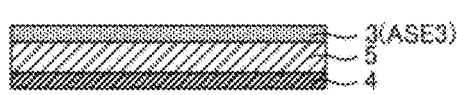
Figure 5D:

For example, in FIGS. 5A to 5D, an anode active material layer 5 is formed on an anode current collector 4, and a solid electrolyte membrane 3 (ASE3') not containing a binder, composed of a sulfide solid electrolyte material, is formed directly on the anode active material layer 5 by an AD method (FIG. 5A). Next, the ASE3' is pressed (FIG. 5B). Thus, the sulfide solid electrolyte material contained in the ASE3' flows so as to fill up pores to allow a denser and firmer solid electrolyte membrane (ASE3) (FIG. 5C). Thereafter, ASE1 is formed on the ASE3 by an AD method (FIG. 5D). Thus, the ASE3 (or the CSE3) becomes so firm a solid electrolyte membrane as to allow the solid electrolyte membrane to be restrained from cracking.

In particular, from the viewpoint of preventing a short circuit, the area of the solid electrolyte membrane and the anode active material layer is occasionally made larger than the area of the cathode active material layer. In that case, stress due to the pressing concentrates on the ends of the cathode active material layer, and the solid electrolyte membrane cracks to bring a possibility that the cathode active material layer and the anode active material layer contact and short-circuit. As shown in FIGS. 5A to 5D, the placement of the firm solid electrolyte membrane (ASE3) in a member on the anode side allows the solid electrolyte membrane 3 to be restrained from cracking due to stress concentration.

The sulfide solid electrolyte material of the CSE1 and the CSE3 may be the same or different; the former is preferable. Similarly, the sulfide solid electrolyte material of the ASE1 and the ASE3 may be the same or different; the former is preferable. The membrane thickness of the CSE3 or the ASE3 (the membrane thickness before pressing) is not particularly limited but is, for example, approximately the same as a numerical value range of the membrane thickness of the CSE1 described above.

The conditions of the AD method for forming the CSE3 or the ASE3 are not particularly limited but may be equalized to the conditions of the CSE1 described above. After forming the membrane by the AD method, the solid electrolyte membrane is preferably pressed by pressure (such as a pressure of 2 ton/cm$^2$ or more) such that the sulfide solid electrolyte material is plastically deformed.

Figure 6A:
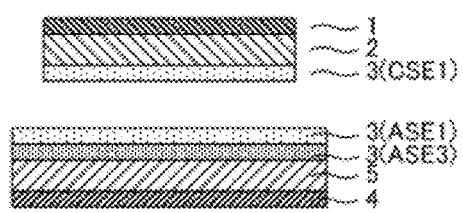
FIGS. 6A to 6C are schematic cross-sectional views each showing another example of a method for producing a lithium solid state battery of the present invention.
Figure 6C:
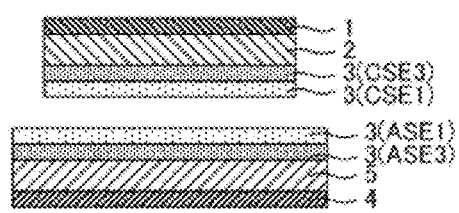
Figure 6B:
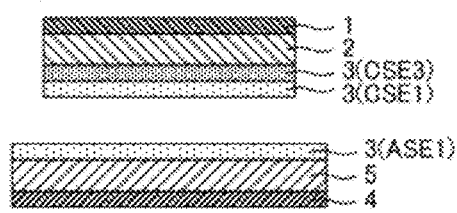

The present invention may offer a combination such that a member on the anode side has the ASE3 and a member on the cathode side does not have the CSE3 as shown in FIG. 6A, a combination such that a member on the cathode side has the CSE3 and a member on the anode side does not have the ASE3 as shown in FIG. 6B, or a combination such that a member on the cathode side has the CSE3 and a member on the anode side has the ASE3 as shown in FIG. 6C.

In the present invention, both the CSE2 and the CSE3 may be formed between the cathode active material layer and the CSE1. The order of the CSE2 and the CSE3 is not particularly limited but may be the order of the cathode active material layer, the CSE2, the CSE3 and the CSE1, or the order of the cathode active material layer, the CSE3, the CSE2 and the CSE1. This point is the same with regard to ASE.

Also, in the present invention, all solid electrolyte membranes existing between the cathode active material layer and the anode active material layer are preferably formed by the AD method. The reason therefor is to allow a lithium battery with favorable input characteristics. Examples of the solid electrolyte membranes formed by the AD method include the CSE1, the CSE3, the ASE1 and the ASE3 described above.

2. Pressing Step

The pressing step in the present invention is a step of forming a solid electrolyte membrane (SE1) with the CSE1 and the ASE1 integrated by opposing and pressing the CSE1 and the ASE1. Also, the SE1 such that an interface between the CSE1 and the ASE1 disappeared is formed by improving denseness of the CSE1 and the ASE1 in the pressing step.

In the present invention, 'the interface between the CSE1 and the ASE1 disappeared' signifies, in cross-sectional observation of the SE1, the case where the interface between the CSE1 and the ASE1 may not be confirmed at all, and the case where the interface between the CSE1 and the ASE1 may be confirmed slightly (for example, 5% or less with respect to the total length of the interface).

The pressure applied in the pressing step is not particularly limited if the pressure is a pressure such as to form the SE1 such that the interface between the CSE1 and the ASE1 disappeared, but varies with denseness of the CSE1 and the ASE1. The pressure is, for example, 1.5 ton/cm$^2$ or more, preferably 2 ton/cm$^2$ or more, more preferably 4 ton/cm$^2$ or more. On the other hand, the pressure is, for example, preferably 10 ton/cm$^2$ or less. Also, the time for applying the pressure is not particularly limited but may be a time such as to allow the SE1, such that the interface between the CSE1 and the ASE1 disappeared, to be formed.

Also, in the pressing step, denseness of the CSE1 and the ASE1 is improved by pressing to make the interface between the CSE1 and the ASE1 disappear. Thus, in the pressing step, heating is not necessary basically and pressing may be performed at room temperature; however, low-temperature heating may be performed as required. Examples of the low-temperature heating include heating at temperature (for example, 100° C. or less) less than crystallization temperature of the sulfide solid electrolyte material.

Also, the SE1 is a solid electrolyte membrane with the CSE1 and the ASE1 integrated. The membrane thickness of the SE1 (after pressing) is not particularly limited but is, for example, within a range of 1 μm to 50 μm, preferably, within a range of 5 μm to 20 μm.

3. Lithium Solid State Battery

Figure 7:
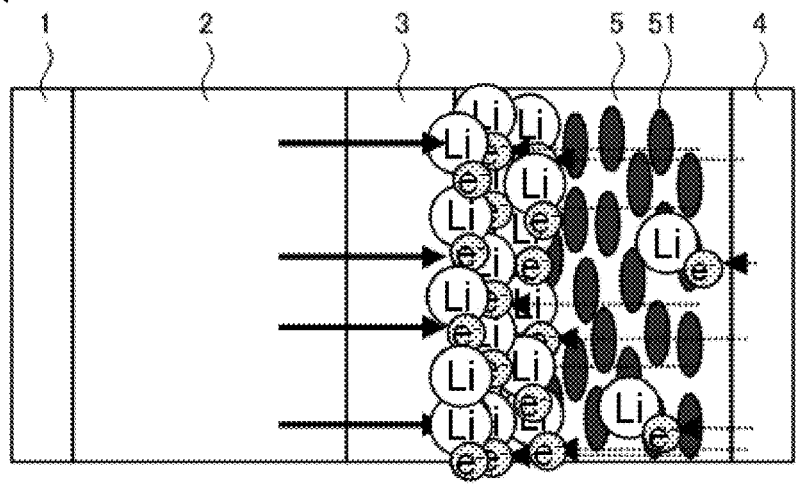
FIG. 7 is a schematic view showing a state during boost charge.

In the present invention, the formation of the solid electrolyte membrane by the AD method allows a lithium solid state battery suitable for boost charge. In the case of performing boost charge, as shown in FIG. 7, Li ions are not inserted into an anode active material 51 close to an anode current collector 4, and a battery reaction is caused on the surface of a solid electrolyte membrane 3 side of an anode active material layer 5. As a result, surface potential of the solid electrolyte membrane 3 side of the anode active material layer 5 decreases and Li precipitates.

Figure 8A:
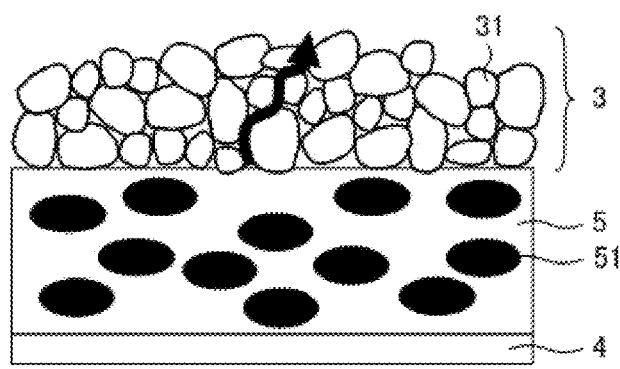
FIGS. 8A and 8B are schematic cross-sectional views each explaining a difference between a solid electrolyte membrane formed by a coating method and a solid electrolyte membrane formed by an AD method.
Figure 8B:
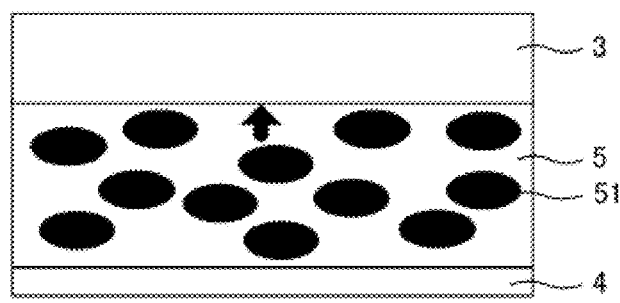

Here, as shown in FIG. 8A, grain boundary of particles 31 of the sulfide solid electrolyte material exists in the solid electrolyte membrane 3 formed by a coating method. In addition, ordinarily, a binder (not shown in the drawing) for binding the particles 31 of the sulfide solid electrolyte material is contained. Thus, a path for Li precipitated in the anode active material layer 5 to reach a cathode active material layer (not shown in the drawing) exists in the solid electrolyte membrane 3 formed by a coating method. In contrast, as shown in FIG. 8B, the solid electrolyte membrane 3 formed by the AD method is so dense a membrane such that the sulfide solid electrolyte material is plastically deformed that the grain boundary scarcely exists. In addition, ordinarily, a binder is not contained. Thus, a path for Li to reach a cathode active material layer (not shown in the drawing) exists extremely less in the solid electrolyte membrane 3 formed by the AD method even though Li is precipitated in the anode active material layer 5. In this manner, the formation of the solid electrolyte membrane by the AD method allows a lithium solid state battery suitable for boost charge.

The lithium solid state battery obtained by the present invention comprises at least the cathode active material layer, the anode active material layer and the solid electrolyte membrane, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the lithium solid state battery obtained by the present invention may be a primary battery or a secondary battery, preferably a secondary battery. The reason therefor is to be useful as a car-mounted battery, for example. Examples of the shape of the lithium solid state battery include a coin shape, a laminate shape, a cylindrical shape and a rectangular shape.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1

First, a sulfide solid electrolyte material having $Li_2S$—$P_2S_5$ as the main component was prepared as raw material powder. A solid electrolyte membrane (AD-SE) was formed on a carbon-coated substrate by an AD method with the use of this raw material powder. The film-forming conditions are as follows.

<Film-Forming Conditions>

Average particle diameter $D_{50}$ of raw material powder 0.8 μm

Temperature normal temperature

Pressure in chamber 600 Pa

Gas He

Gas flow rate 20 L/min. (assist gas 19 L/min.)

Aerosol vessel 500 mL

Scan rate 10 mm/sec.

Distance between substrate nozzles 20 mm

When impact speed of the particles was calculated, $V_{min}$ was 173 m/s and $V_{max}$ was 505 m/s.

Thus, a member in which the solid electrolyte membrane (AD-SE) was formed on the carbon coat was produced. Incidentally, this AD-SE corresponds to CSE1 or ASE1. Next, two of the members were pressed at a pressure of 1.5 ton/cm$^2$, 2.9 ton/cm$^2$, 4.3 ton/cm$^2$ and 7.3 ton/cm$^2$ while disposing the AD-SE so as to oppose. Thus, a laminated body for evaluation was obtained.

[Evaluations]

(SEM Observation)

Figure 9A:
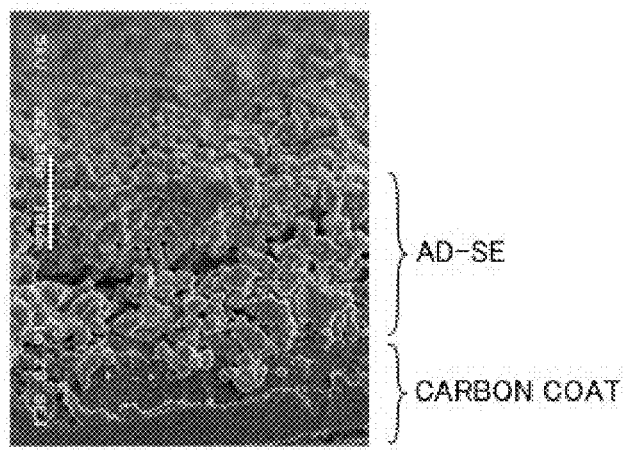
FIGS. 9A and 9B are cross-sectional images of AD-SE before and after pressing in Example 1.
Figure 9B:
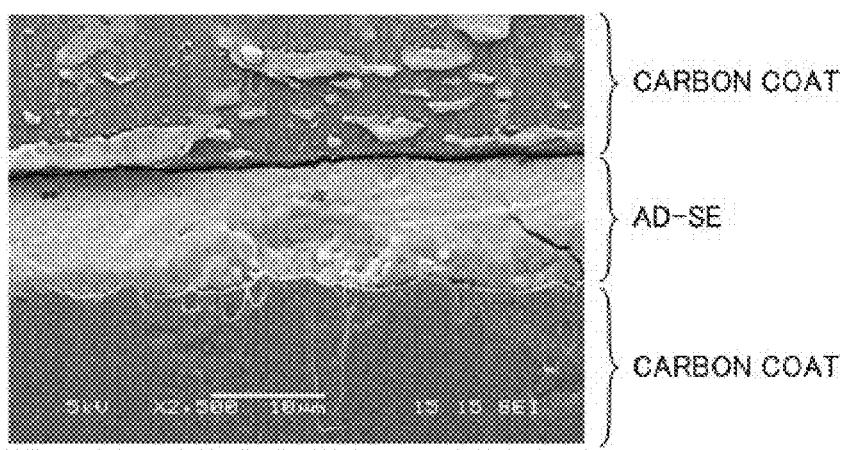

The cross section of the AD-SE before and after pressing was observed by using a scanning electron microscope (SEM). The results are shown in FIGS. 9A and 9B. As shown in FIG. 9A, pores existed in the AD-SE before pressing; however, as shown in FIG. 9B, pores scarcely existed in the AD-SE after pressing and the interface of the AD-SE disappeared.

(Membrane Thickness Measurement and Li Ion Conductance Measurement of Solid Electrolyte Membrane)

Figure 10:
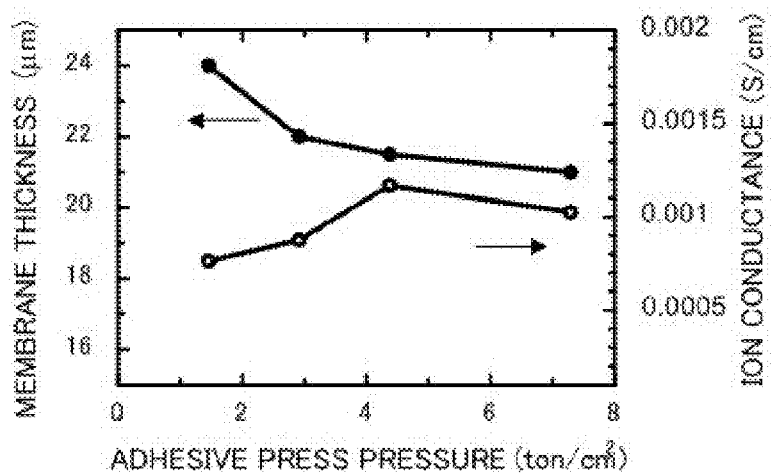
FIG. 10 is a result of measuring membrane thickness and Li ion conductance of a solid electrolyte membrane (AD-SE after pressing) of an evaluation laminated body obtained in Example 1.

Membrane thickness measurement and Li ion conductance measurement were performed for the solid electrolyte membrane (AD-SE) formed on a carbon-coated substrate. Incidentally, the solid electrolyte membrane (AD-SE) was pressed at the pressure described above to make the production conditions of the laminated body for evaluation correspond. Also, Li ion conductance was measured by an alternating current impedance method. The results are shown in FIG. 10. As shown in FIG. 10, when the pressure during pressing was increased, the membrane thickness of the solid electrolyte membrane was decreased, so that it was suggested that the increase of the pressure during pressing improved the density of the solid electrolyte membrane. Thus, it was guessed that the pressing of the solid electrolyte membrane caused microstructural change in the solid electrolyte membrane and the interface between the CSE1 and the ASE1 disappeared. Also, a correlation was observed between the decrease of the membrane thickness of the solid electrolyte membrane and the improvement of Li ion conductance of the solid electrolyte membrane. Also, the membrane thickness of the AD-SE before pressing was 30 μm and the solid electrolyte membrane converged on 21 μm by pressing, so that the membrane thickness decreasing rate was 30%. The membrane thickness decreasing rate in the present invention is preferably within a range of 3% to 30%, for example.

Example 2

A solid electrolyte membrane (AD-SE) was formed on a carbon-coated substrate on the film-forming conditions which were the same as Example 1. The membrane thickness of the AD-SE was determined at approximately 400 μm.

Comparative Example 1

The raw material powder used in Example 2 and butylene rubber (BR) as a binder were dispersed into anhydrous heptane so that the ratio of the binder was 1% by weight to obtain slurry. The obtained slurry was coated on a substrate and pressed at a pressure of 1.5 ton/cm² or more to thereby obtain a solid electrolyte membrane.

[Evaluations]
(Li Ion Conductance Measurement)

Figure 11:
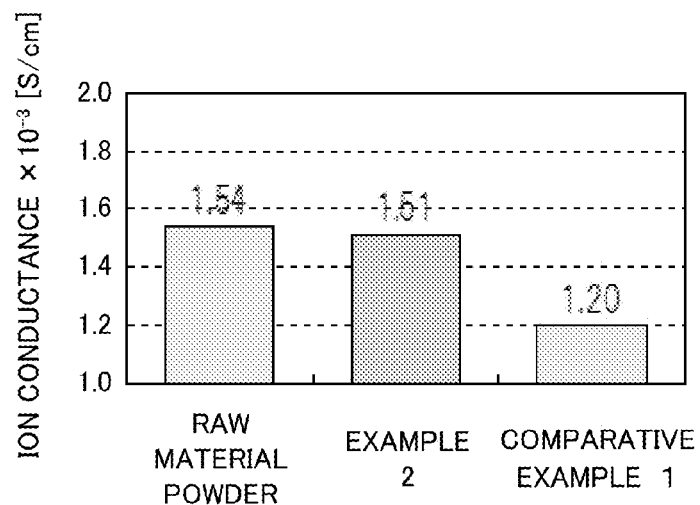
FIG. 11 is a result of measuring Li ion conductance of solid electrolyte membranes of evaluation laminated bodies obtained in Example 2 and Comparative Example 1.

Li ion conductance of the solid electrolyte membranes obtained in Example 2 and Comparative Example 1 was measured by an alternating current impedance method. The results are shown in FIG. 11. As shown in FIG. 11, in Example 2 not containing a binder, Li ion conductance improved by approximately 25% as compared with Comparative Example 1 containing a binder. In addition, in Example 2, Li ion conductance equal to the raw material powder was obtained.

Example 3

First, natural graphite carbon as an anode active material, a sulfide solid electrolyte material (average particle diameter $D_{50}$=0.8 μm) having $Li_2S$—$P_2S_5$ as the main component, and PVDF as a binder were dispersed into dehydrated butyl butyrate to obtain slurry. The obtained slurry was coated on an anode current collector and pressed at a pressure of 2 ton/cm² or more to thereby obtain an anode active material layer. Next, a sulfide solid electrolyte material having $Li_2S$—$P_2S_5$ as the main component was prepared as raw material powder. A solid electrolyte membrane (AD-SE) was formed on the anode active material on the film-forming conditions, which were the same as Example 1, by an AD method with the use of this raw material powder.

Thus, a member in which the solid electrolyte membrane (AD-SE) was formed on the anode active material layer was produced. Thereafter, the member was pressed at a pressure of 1.5 ton/cm² or more to thereby form the pressed AD-SE. Incidentally, this AD-SE corresponds to ASE3. Thereafter, a solid electrolyte membrane (AD-SE) was formed by performing an AD method again on the same conditions as the above. This AD-SE corresponds to ASE1. Incidentally, the thickness of the ASE1 aimed for 7 μm.

On the other hand, $LiNi_{1/3}Mn_{1/3}Co_{1/3}O_2$ as a cathode active material, a sulfide solid electrolyte material (average particle diameter $D_{50}$=0.8 μm) having $Li_2S$—$P_2S_5$ as the main component, and PVDF as a binder were dispersed into dehydrated butyl butyrate to obtain slurry. The obtained slurry was coated on a cathode current collector and pressed at a pressure of 2 ton/cm² or more to thereby obtain a cathode active material layer. Thereafter, a solid electrolyte membrane (AD-SE) was formed on the cathode active material layer by performing an AD method on the same conditions as the above. This AD-SE corresponds to CSE1. Incidentally, the thickness of the CSE1 aimed for 3 μm. Lastly, the CSE1 and the ASE1 were pressed at a pressure of 1.5 ton/cm² or more while disposed so as to oppose. Thus, an evaluation battery was obtained.

[Evaluations]
(SEM Observation)

Figure 12A:
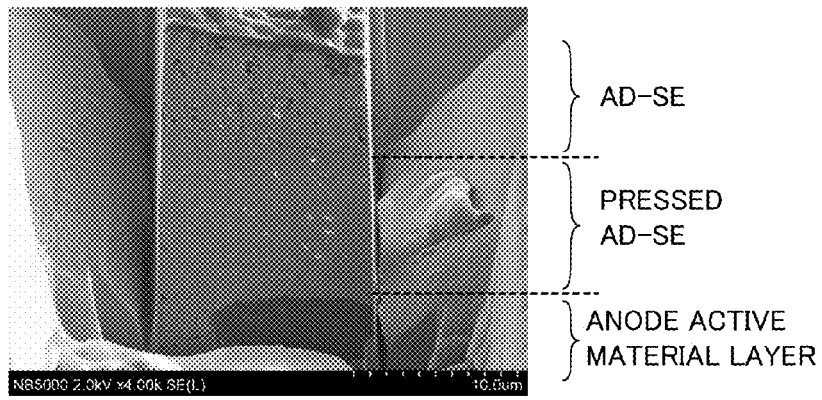
FIGS. 12A and 12B are cross-sectional images of AD-SE (before bonding) formed on an anode active material layer in Example 3.
Figure 12B:
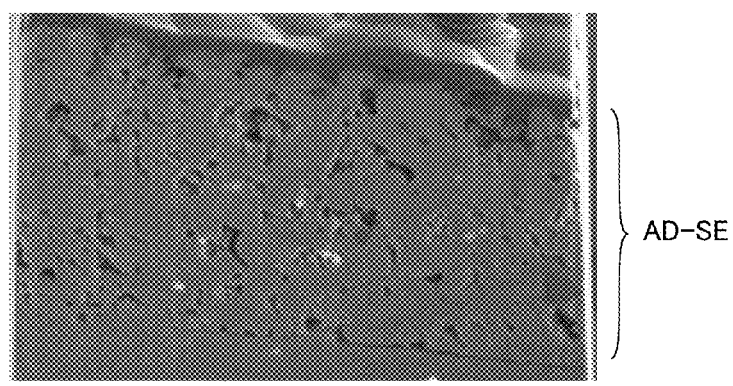

The cross section of the AD-SE (before bonding) formed on the anode active material layer was observed by using a scanning electron microscope (SEM). The results are shown in FIGS. 12A and 12B. Incidentally, FIG. 12B is a magnified view of the AD-SE in FIG. 12A. As shown in FIG. 12A, when the pressed AD-SE and the unpressed AD-SE were compared, it may be confirmed that the density improved. It may be confirmed from this fact that the pressing of the solid electrolyte membrane caused microstructural change in the solid electrolyte membrane. Image analysis was performed for the AD-SE shown in FIG. 12B and the porosity of a cross section of the solid electrolyte membrane measured 9%. Also, in the obtained evaluation battery, the interface between the CSE1 and the ASE1 disappeared. On the other hand, the pressed AD-SE was pressed at a pressure of 1.5 ton/cm² or more while opposed; however, the interface did not disappear.

Example 4

First, natural graphite carbon as an anode active material, a sulfide solid electrolyte material (average particle diameter $D_{50}$=0.8 μm) having $Li_2S$—$P_2S_5$ as the main component, and PVDF as a binder were dispersed into dehydrated butyl butyrate to obtain slurry. The obtained slurry was coated on an anode current collector and pressed at a pressure of 2 ton/cm² or more to thereby obtain an anode active material layer. Next, a sulfide solid electrolyte material having $Li_2S$—$P_2S_5$ as the main component was prepared as raw material powder. A solid electrolyte membrane (AD-SE) was formed on the anode active material on the film-forming conditions, which were the same as Example 1, by an AD method with the use of this raw material powder.

Thus, a member in which the solid electrolyte membrane (AD-SE) was formed on the anode active material layer was produced. This AD-SE corresponds to ASE1. Incidentally, the thickness of the ASE1 aimed for 7 μm.

On the other hand, $LiNi_{2/3}Mn_{1/3}Co_{1/3}O_2$ as a cathode active material, a sulfide solid electrolyte material (average particle diameter $D_{50}$=0.8 μm) having $Li_2S$—$P_2S_5$ as the main component, and PVDF as a binder were dispersed into dehydrated butyl butyrate to obtain slurry. The obtained slurry was coated on a cathode current collector and pressed at a pressure of 2 ton/cm² or more to thereby obtain a cathode active material layer. Thereafter, a solid electrolyte membrane (AD-SE) was formed on the cathode active material layer by performing an AD method on the same conditions as the above. This AD-SE corresponds to CSE1. Incidentally, the thickness of the CSE1 aimed for 3 μm. Lastly, the CSE1 and the ASE1 were pressed at a pressure of 1.5 ton/cm$^2$ or more while disposed so as to oppose. Thus, an evaluation battery was obtained. In the obtained evaluation battery, the interface between the CSE1 and the ASE1 disappeared.

Example 5

Before forming a solid electrolyte membrane corresponding to the ASE1 and the CSE1 in Example 4, solid electrolyte membranes (ASE2, CSE2) were formed on an anode active material layer and a cathode active material layer respectively by a coating method. Specifically, the raw material powder used in Example 4 and BR as a binder were dispersed into anhydrous heptane so that the ratio of the binder was 1% by weight to obtain slurry. The obtained slurry was coated on a substrate and pressed at a pressure of 1.5 ton/cm$^2$ or more to thereby obtain a solid electrolyte membrane. The thickness of the solid electrolyte membrane aimed for 5 μm. An evaluation battery was obtained in the same manner as Example 4 except for forming the ASE2 and the CSE2, and aiming for 3 μm as the thickness of the ASE1 and the CSE1. In the obtained evaluation battery, the interface between the CSE1 and the ASE1 disappeared.

Comparative Example 2

First, an anode active material layer and a cathode active material layer were produced in the same manner as Example 4. Next, the raw material powder used in Example 4 and BR as a binder were dispersed into anhydrous heptane so that the ratio of the binder was 1% by weight to obtain slurry. The obtained slurry was coated on an aluminum foil and dried. Next, the dried surface was contacted with the anode active material layer and pressed at a pressure of 1.5 ton/cm$^2$ or more. Next, the aluminum foil was removed to form a solid electrolyte membrane on the anode active material layer. Thereafter, the solid electrolyte membrane and the cathode active material layer were opposed and pressed at a pressure of 2 ton/cm$^2$ or more to thereby obtain an evaluation battery.

[Evaluations]
(Output Measurement and Discharge Capacity Measurement)

Figure 13A:
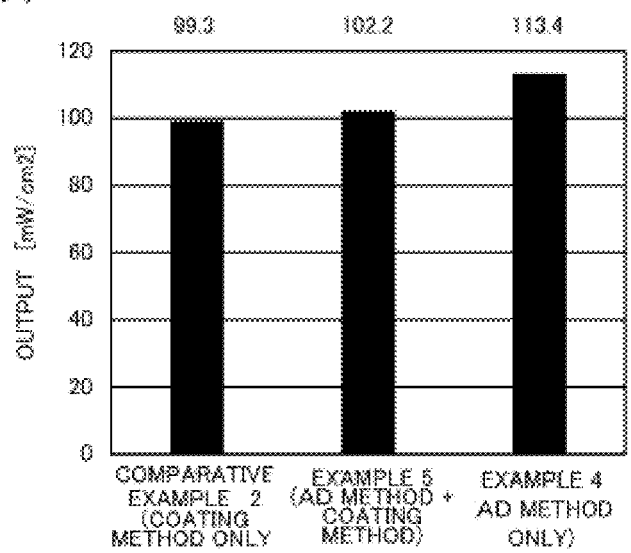
FIGS. 13A and 13B are results of measuring output and discharge capacity of evaluation batteries obtained in Examples 4 and 5 and Comparative Example 2.
Figure 13B:
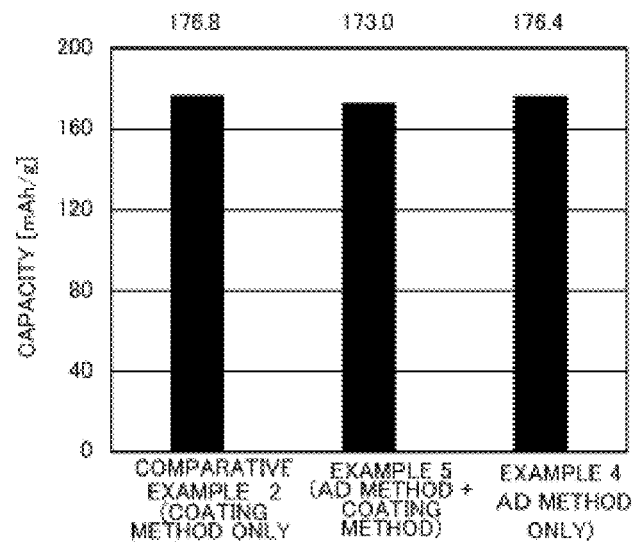

The evaluation batteries obtained in Examples 4 and 5 and Comparative Example 2 were constrained at 150 kgf to measure output and discharge capacity. The measurement conditions of output are as follows. That is to say, the output was measured by performing CCCV charge at SOC 60% voltage and current value ⅓ C and discharge at 60 mW/cm$^2$, and thereafter performing CCCV charge at SOC 60% voltage and current value ⅓ C and discharge repeatedly at 80 mW/cm$^2$, 100 mW/cm$^2$ and 120 mW/cm$^2$. The measurement conditions of discharge capacity are as follows. That is to say, the discharge capacity was measured by performing CCCV charge at cut voltage 4.55 V and current value ⅓ C, halting for 10 minutes, and performing CCCV discharge at cut voltage 3 V and current value ⅓ C up to end current ¹⁄₁₀₀ C. The results are shown in FIGS. 13A and 13B. As shown in FIGS. 13A and 13B, in Example 4 (the case of forming the solid electrolyte membrane by only an AD method) and Example 5 (the case of forming the solid electrolyte membrane by an AD method and a coating method), as compared with Comparative Example 2 (the case of forming the solid electrolyte membrane by only a coating method), the output improved and the capacity was equal.

Figure 14A:
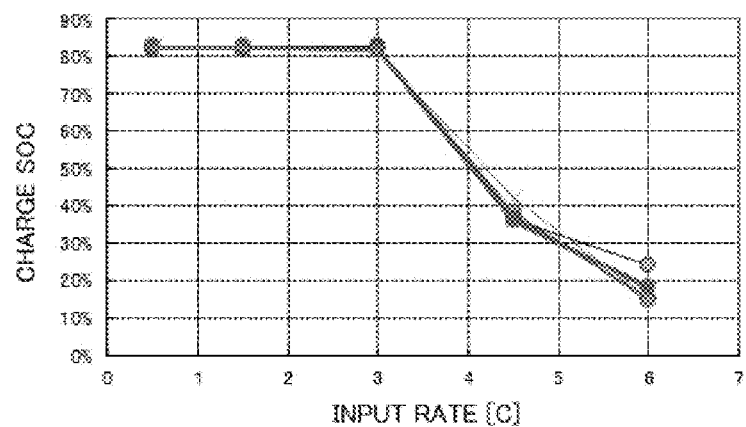
FIGS. 14A and 14B are graphs each explaining a difference in input performance between the case of forming a solid electrolyte membrane by an AD method and the case of forming a solid electrolyte membrane by a coating method.
Figure 14B:
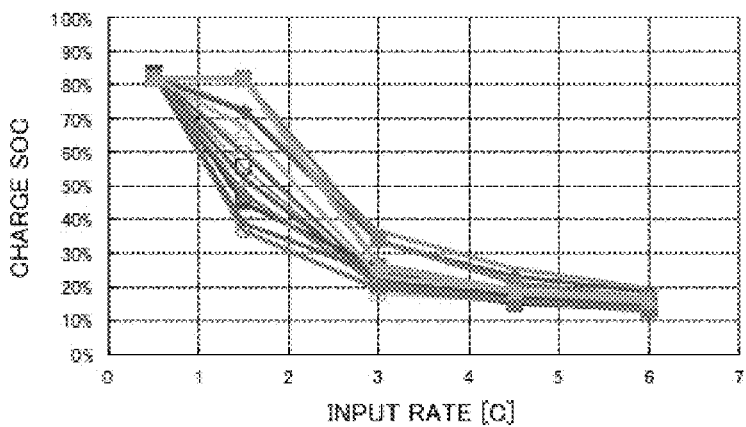
Figure 15:
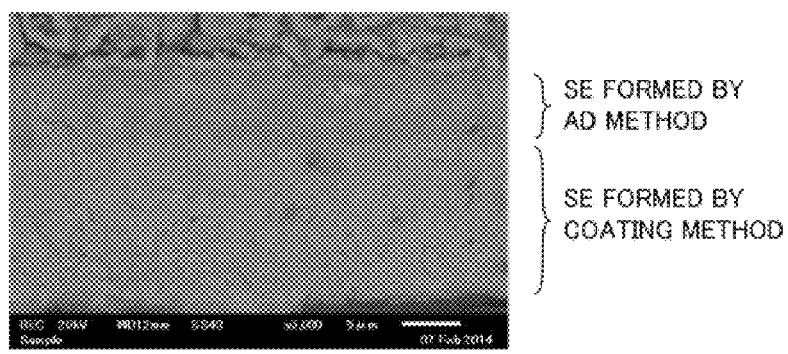
FIG. 15 is a cross-sectional image showing a difference between a solid electrolyte membrane formed by an AD method and a solid electrolyte membrane formed by a coating method.

Also, for reference, a difference in input performance between the case of forming the solid electrolyte membrane by an AD method and the case of forming the solid electrolyte membrane by a coating method is shown in FIGS. 14A and 14B. As shown in FIGS. 14A and 14B, in the case of forming the solid electrolyte membrane by an AD method, input performance improves greatly. The reason therefor is guessed to be that the solid electrolyte membrane formed by an AD method is so denser than the solid electrolyte membrane formed by a coating method as to effectively restrain Li from precipitating and growing in the anode active material layer. Actually, as shown in FIG. 15, in the solid electrolyte membrane formed by a coating method, the presence of a grain boundary may be confirmed over the whole region; however, in the solid electrolyte membrane formed by an AD method, a grain boundary is scarcely present.

Reference Example

A compressive breaking test was performed for the raw material powder (the sulfide solid electrolyte material having $Li_2S$—$P_2S_5$ as the main component) to calculate yield stress. First, the raw material powder was dispersed into anhydrous heptane by using an ultrasonic homogenizer, and taken out by a micropipet. Next, the taken solution was dropped on a copper stage by several μL and dried directly. Next, SEM observation was performed on the copper stage to record microstructure and location of the intended raw material powder. Next, the copper stage was moved to a nanoindenter to evaluate mechanical characteristics.

Figure 16:
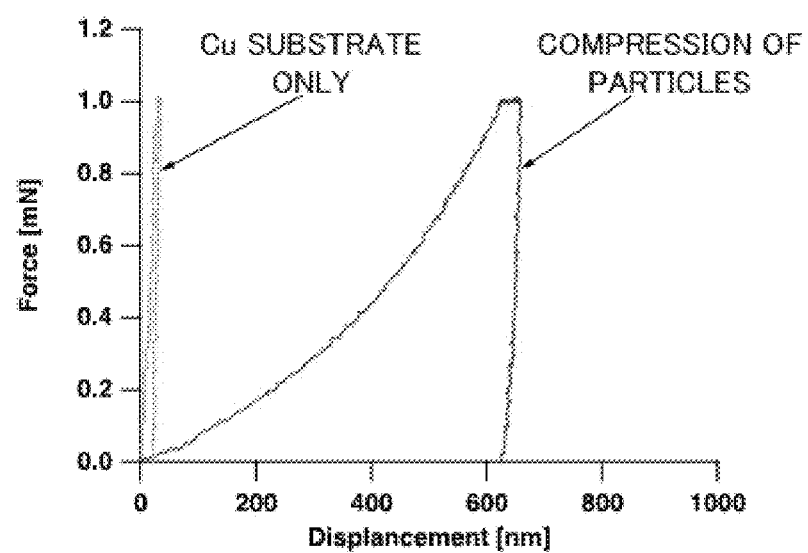
FIG. 16 is a result of a compressive breaking test of a sulfide solid electrolyte material.

The results are shown in FIG. 16. As shown in FIG. 16, the yield stress of the raw material powder was approximately 600 MPa. When the same experiment was performed plural times, the yield stress of the raw material powder was within a range of 400 MPa to 650 MPa, which was similar to metal aluminum. Also, a compressive breaking curve exhibited plastic deformation behavior similarly to metal aluminum.

REFERENCE SIGNS LIST

1 cathode current collector
2 cathode active material layer
3 solid electrolyte membrane
4 anode current collector
5 anode active material layer
11 chamber
12 pedestal
13 substrate
14 rotary pump
15 gas bomb
16 raw material powder
17 aerosol generator
18 nozzle

What is claimed is:

1. A method for producing a lithium solid state battery, comprising steps of:
a membrane-forming step of forming a first cathode solid electrolyte membrane not containing a binder, composed of a sulfide solid electrolyte material, on a cathode active material layer by an aerosol deposition method and a first anode solid electrolyte membrane not containing a binder, composed of a sulfide solid electrolyte material, on an anode active material layer by an aerosol deposition method; and a pressing step of forming a solid electrolyte membrane by bringing the first cathode solid electrolyte membrane and the first anode solid electrolyte membrane into direct contact and pressing the first cathode solid electrolyte membrane and the first anode solid electrolyte membrane in direct contact with each other, wherein in the solid electrolyte membrane, an interface between the first cathode solid electrolyte membrane and the first anode solid electrolyte membrane is disappeared by improving denseness of the first cathode solid electrolyte membrane and the first anode solid electrolyte membrane in the pressing step, and wherein a porosity of a cross section of the first cathode solid electrolyte membrane and a porosity of a cross section of the first anode solid electrolyte membrane prior to the pressing step are each within a range of 1% to 40%.

2. The method for producing a lithium solid state battery according to claim 1, wherein a second cathode solid electrolyte membrane is formed on the cathode active material layer by a coating method comprising applying onto the cathode active material a slurry comprised of the sulfide solid electrolyte material in a dispersion medium and drying the applied slurry to form the second cathode solid electrolyte membrane before forming the first cathode solid electrolyte membrane.

3. The method for producing a lithium solid state battery according to claim 1, wherein a second solid electrolyte membrane is formed on the anode active material layer by a coating method comprising applying onto the anode active material a slurry comprised of the sulfide solid electrolyte material in a dispersion medium and drying the applied slurry to form the second anode solid electrolyte membrane before forming the first anode solid electrolyte membrane.

4. The method for producing a lithium solid state battery according to claim 1, wherein a membrane-forming treatment for forming a precursor solid electrolyte membrane on the anode active material layer by an aerosol deposition method, and a pressing treatment for forming a second solid electrolyte membrane by pressing the precursor solid electrolyte membrane are performed before forming the first anode solid electrolyte membrane.

5. The method for producing a lithium solid state battery according to claim 1, wherein all anode solid electrolyte membranes and all cathode solid electrolyte membranes existing between the cathode active material layer and the anode active material layer are formed by an aerosol deposition method.

6. The method for producing a lithium solid state battery according to claim 1, wherein a porosity of a cross section of the first cathode solid electrolyte membrane and a porosity of a cross section of the first anode solid electrolyte membrane prior to the pressing step are each within a range of 5% to 40%.

7. The method for producing a lithium solid state battery according to claim 1, wherein a porosity of a cross section of the first cathode solid electrolyte membrane and a porosity of a cross section of the first anode solid electrolyte membrane prior to the pressing step are each within a range of 9% to 40%.

8. The method for producing a lithium solid state battery according to claim 1, wherein a pressure applied in the pressing step is less than 10 ton/cm$^2$.

9. The method for producing a lithium solid state battery according to claim 1, wherein a pressure applied in the pressing step is 7.3 ton/cm$^2$ or less.

* * * * *